US012744960B2

(12) United States Patent
Zhang et al.

(10) Patent No.: US 12,744,960 B2
(45) Date of Patent: Sep. 22, 2026

(54) METHOD AND APPARATUS FOR DYNAMICALLY DOWNLOADING A VIDEO, ELECTRONIC DEVICE AND STORAGE MEDIUM

(71) Applicant: BEIJING BYTEDANCE NETWORK TECHNOLOGY CO., LTD., Beijing (CN)

(72) Inventors: Aoyang Zhang, Beijing (CN); Qing Huang, Beijing (CN); Qian Ma, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 70 days.

(21) Appl. No.: 18/844,777

(22) PCT Filed: Feb. 28, 2023

(86) PCT No.: PCT/CN2023/078822

§ 371 (c)(1),
(2) Date: Sep. 6, 2024

(87) PCT Pub. No.: WO2023/169262

PCT Pub. Date: Sep. 14, 2023

(65) Prior Publication Data

US 2025/0310597 A1 Oct. 2, 2025

(30) Foreign Application Priority Data

Mar. 8, 2022 (CN) ........................ 202210220649.9

(51) Int. Cl.

*H04N 21/433* (2011.01)
*H04N 21/442* (2011.01)
*H04N 21/845* (2011.01)

(52) U.S. Cl.

CPC ... *H04N 21/4331* (2013.01); *H04N 21/44204* (2013.01); *H04N 21/8456* (2013.01)

(58) Field of Classification Search

None

See application file for complete search history.

(56) References Cited

U.S. PATENT DOCUMENTS 6,463,508 B1 10/2002 Wolf et al.
9,811,261 B1 * 11/2017 Ramani ................ G06F 3/0631

(Continued)

FOREIGN PATENT DOCUMENTS

CN 102790925 A 11/2012
CN 103024446 A 4/2013

(Continued)

OTHER PUBLICATIONS

China Patent Application No. 202210220649.9; Office Action; dated Oct. 31, 2023; 11 pages.

(Continued)

*Primary Examiner* — Alexander Q Huerta
(74) *Attorney, Agent, or Firm* — BakerHostetler

(57) ABSTRACT

A method and an apparatus for dynamically downloading a video, an electronic device and a non-transient computer-readable storage medium are provided. The method includes determining a current video segment corresponding to a current playback time point during a playback process of a current video; acquiring a cache decision threshold value corresponding to the current video segment; and determining a download strategy for the current video based on an amount of cached data that is currently cached and not laved and the cache decision threshold value.

20 Claims, 4 Drawing Sheets

Determine a current video segment corresponding to a current playback time point during a playback process of a current video — S110

Acquire a cache decision threshold value corresponding to the current video segment — S120

Determine a download strategy for the current video based on an amount of cached data that is currently cached and not played and the cache decision threshold value — S130

(56) References Cited

U.S. PATENT DOCUMENTS

| | | | | |
|---|---|---|---|---|
| 11,622,140 | B2 * | 4/2023 | Kapchits | H04N 21/2401<br>709/231 |
| 2012/0259994 | A1 * | 10/2012 | Gillies | H04L 65/611<br>709/231 |
| 2013/0060911 | A1 * | 3/2013 | Nagaraj | H04L 65/612<br>709/219 |
| 2014/0258854 | A1 * | 9/2014 | Li | H04N 21/414<br>715/702 |
| 2015/0172352 | A1 * | 6/2015 | Gopalakrishnan | H04L 67/1085<br>709/219 |
| 2016/0164788 | A1 * | 6/2016 | Goel | H04L 65/764<br>709/228 |
| 2018/0213296 | A1 * | 7/2018 | Kellar | H04L 67/568 |
| 2025/0310597 | A1 * | 10/2025 | Zhang | H04N 21/44204 |

FOREIGN PATENT DOCUMENTS

| | | | |
|---|---|---|---|
| CN | 103391468 | B | 12/2016 |
| CN | 108271048 | A | 7/2018 |
| CN | 104995923 | B | 3/2019 |
| CN | 109525887 | A | 3/2019 |
| CN | 110933482 | A | 3/2020 |
| CN | 113569150 | A | 10/2021 |
| CN | 114040245 | A | 2/2022 |
| CN | 114584826 | A | 6/2022 |
| CN | 114584826 | B | 4/2024 |
| EP | 2785067 | A1 | 10/2014 |

OTHER PUBLICATIONS

International Patent Application No. PCT/CN2023/078822; Int'l Search Report; dated May 11, 2023; 2 pages.

* cited by examiner

METHOD AND APPARATUS FOR DYNAMICALLY DOWNLOADING A VIDEO, ELECTRONIC DEVICE AND STORAGE MEDIUM

The present disclosure is a U.S. national stage application of International Patent Application No. PCT/CN2023/078822, filed on Feb. 28, 2023, which claims the priority to and benefits of Chinese Patent Application No. 202210220649.9, filed on Mar. 8, 2022. All the aforementioned patent applications are hereby incorporated by reference in their entireties.

TECHNICAL FIELD

Embodiments of the present disclosure relate to the technical field of computer data processing, and for example, to a method for dynamically downloading a video, an apparatus, an electronic device and a storage medium.

BACKGROUND

During viewing of an online video, a player of a terminal continuously requests video data from cloud service and places the downloaded data in the video cache. When the player loads the resource data, in order to combat the network jitter problem, a playback progress is loaded with part of the data in advance. The playback progress includes a progress that has been viewed and a progress bar that has not been viewed but has been downloaded. A progress bar that has been downloaded and not yet played may also be referred to as a player cache, the player cache is present to account for bandwidth jitter causing stuttering during playback.

However, the player cache of the player in the related art is a fixed cache, the fixed cache has a disadvantage of contradiction between user playback experience and data cost. The larger the fixed cache, the more data is downloaded, resulting in less chance of a user stuttering, but the higher the amount of data wasted. When the cache is reduced, the amount of data downloaded in advance becomes less, and when the network conditions jitter, the probability of stuttering of playback is greatly increased, and finally, the video viewing experience of the user is affected, causing the user of the video service provider to churn.

SUMMARY

The embodiments of the present disclosure provide a method for dynamically downloading a video, an apparatus, an electronic device and a storage medium, to solve the problem of the high waste rate of playback download data in the case of the fixed cache, and to realize the reduction of the waste of video download data without affecting the user viewing experience.

In the first aspect, an embodiment of the present disclosure provides a method for dynamically downloading a video, and the method includes:

determining a current video segment corresponding to a current playback time point during a playback process of a current video;

acquiring a cache decision threshold value corresponding to the current video segment; and determining a download strategy for the current video based on an amount of cached data that is currently cached and not played and the cache decision threshold value.

In the second aspect, an embodiment of the present disclosure further provides an apparatus for dynamically downloading a video, and the apparatus includes: a video segment determination module, a cache decision threshold value acquisition module and a download strategy determination module.

The video segment determination module is configured to determine a current video segment corresponding to a current playback time point during a playback process of a current video.

The cache decision threshold value acquisition module is configured to acquire a cache decision threshold value corresponding to the current video segment.

The download strategy determination module is configured to determine a download strategy for the current video based on an amount of cached data that is currently cached and not played and the cache decision threshold value.

In the third aspect, an embodiment of the present disclosure further provides an electronic device, and the electronic device includes:

at least one processor; and a storage configured is configured to store at least one program, in which when the at least one program executed by the at least one processor, causes the at least one processor to implement the method for dynamically downloading the video according to any one of the embodiments of the present disclosure.

In the fourth aspect, the embodiments of the present disclosure further provide a storage medium includes computer-executable instructions, when the computer-executable instructions executed by a computer processor, are used to perform the method for dynamically downloading the video according to any one of the embodiments of the present disclosure.

BRIEF DESCRIPTION OF DRAWINGS

Throughout the drawings, the same or similar reference numerals refer to the same or similar elements. It should be understood that the figures are schematic and that elements and elements are not necessarily drawn to ratio.

DETAILED DESCRIPTION

Embodiments of the present disclosure are described in more detail below with reference to the accompanying drawings.

It should be understood that various steps recorded in the implementation modes of the method of the present disclosure may be performed according to different orders and/or performed in parallel. In addition, the implementation modes of the method may include additional steps and/or steps omitted or unshown. The scope of the present disclosure is not limited in this aspect.

As used herein, the term "including" and variations thereof used in this article are open-ended inclusion, namely "including but not limited to". The term "based on" refers to "at least partially based on". The term "one embodiment" means "at least one embodiment"; the term "another embodiment" means "at least one other embodiment"; and the term "some embodiments" means "at least some embodiments". Relevant definitions of other terms may be given in the description hereinafter.

Note that the concepts such as "first" and "second" mentioned in the present disclosure are only used to distinguish different apparatuses, modules or units, and are not intended to limit orders or interdependence relationships of functions performed by these apparatuses, modules or units.

Modifications of "one" and "more" mentioned in the present disclosure are schematic rather than restrictive, and those skilled in the art should understand that unless otherwise explicitly stated in the context, it should be understood as "one or more".

Figure 1:
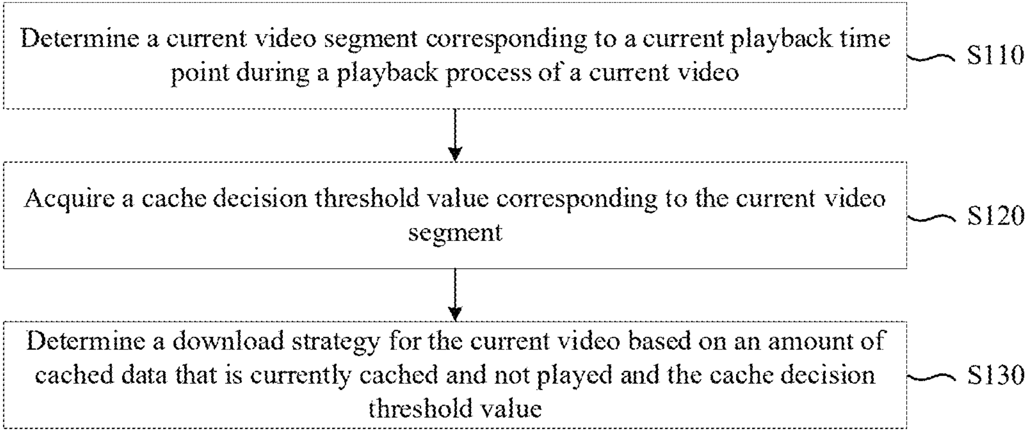
FIG. 1 is a schematic flow diagram of a method for dynamically downloading a video according to an embodiment of the present disclosure.

FIG. 1 is a schematic flow diagram of a method for dynamically downloading a video according to an embodiment of the present disclosure, the embodiment of the present disclosure is adapted in a case of dynamic downloading of a video to be played in a player, the method may be performed by an apparatus for dynamically downloading a video provided by an embodiment of the present disclosure, the apparatus for dynamically downloading the video may be implemented by a form of software and/or hardware, optionally, implemented by an electronic device, the electronic device may be a mobile terminal or a Personal Computer (PC) end, and the like.

Figure 2:
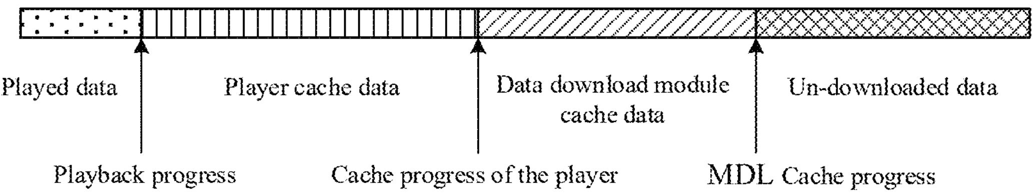
FIG. 2 is a schematic diagram of a structure of a data cache according to an embodiment of the present disclosure.

Before introducing technical solutions of the embodiments of the present disclosure, application scenarios of the technical solutions disclosed by the present embodiments are exemplarily introduced. Currently, the following application scenarios are only as optional application scenarios of the embodiments of the present disclosure, the technical solutions of the present embodiment can also be applied to other scenarios requiring dynamic download, and the present embodiment does not limit the application scenarios of the technical solutions. Exemplarily, the application scenarios include:

In the watching process of the online video, the video playback requires the cooperation of the two modules. In which the first part includes a player, and the second part includes a data download module. The data download module is responsible for downloading video data from the server and caching the downloaded video data, and the player reads video data from the data cached by the data download module and presents the video to the user after decoding and rendering the read video data. As shown in FIG. 2, the data download module cache data includes video data that has been downloaded but has not yet been read by the player. The player cache data includes video data that the player has read from the data download module but has not yet been played, the played data being video data that the user has watched at present. The data download module is responsible for downloading the video data, the data downloaded from the network is first placed in the data download module for data caching, and the player continuously reads the cached video data from the data download module and places the read video data in the player cache.

Currently, players typically use a fixed size player cache. The player cache size can be understood as maximum amount of data that the player can read from the data download module. With constant network conditions, the larger the cache, the more data can be cached, resulting in less likelihood of user stuttering. However, when the user terminates viewing during the viewing process, the cached data is wasted, resulting in a loss of download resources. The biggest disadvantage of the fixed cache logic of the player in related art is the contradiction between user playback experience and data cost. The larger the fixed cache, the more data is downloaded, resulting in less chance of the user stuttering, but the higher the amount of data wasted. When the cache is reduced, the amount of data downloaded in advance becomes less, and the probability of stuttering the playback is greatly increased when the network conditions jitter.

Waste of data can occur in two parts, the first part is the data that the player cache is not watching, and the second part is the part of the data download module that has been downloaded but not read by the player.

In order to solve the contradiction of the above user playback experience and data cost, i.e., to reduce the waste of video download data in the case that the implementation does not affect the user viewing experience, the embodiments of the present disclosure provide a method for dynamically downloading a video. As in FIG. 1, the technical solution of the present embodiment includes:

S110, determine a current video segment corresponding to a current playback time point during a playback process of a current video.

S120, acquire a cache decision threshold value corresponding to the current video segment.

S130, determine a download strategy for the current video based on an amount of cached data that is currently cached and not played and the cache decision threshold value.

In the present embodiment, the amount of cached data that is currently cached and not played is acquired in real time, and the amount of cached data is the amount of data for which the player can perform stutter-free playback. By setting the cache decision threshold value, the amount of cached data currently cached and not played is judged, and the download strategy for the current video is determined according to the judgment result. The download strategy for the current video may include continued download of the un-downloaded video and stop download of the un-downloaded video, and play the amount of cached data.

In some embodiments, determining the download strategy for the current video based on amount of cached data that is currently cached and not played and the cache decision threshold value may include: when the amount of cached data that is currently cached and not played is greater than or equal to the cache decision threshold value, indicating that the amount of cached data is sufficient, stopping the download of the un-downloaded video, and playback the amount of cached data, avoiding the case that the amount of cached data is excessive when the user terminates playback the video; when the amount of cached data that is currently cached and not played is less than the cache decision threshold value, indicating that the amount of cached data is insufficient, and continuing the download of the un-downloaded video, to avoid playback stuttering caused by insufficient cached data. By setting the cache decision threshold, the download strategy for the current video can be dynamically adjusted to balance the smoothness of the video playback and the efficient utilization of download resources.

On the basis of the above embodiment, according to different stages of the video playback, the viewing needs of the user for the video are different, and the corresponding probability of terminating the video playback is also different. Exemplarily, at the initial stage of video playback, the user initially knows the content of the video, and judges whether to continue watching according to the learned playback content or playback duration, i.e., the user's video watching state is unstable at the initial stage of the playback, the probability of terminating the playback of the video is high, and there is a high probability of wasting the cached data; At the end stage of the playback of the video, the user is in a stable video watching state, the probability of terminating the playback of the video is small, that is, the probability of wasting the cached data is small. The amount of cached data at different playback stages is discriminated based on the same cache decision threshold value, and the discrimination is single, poor in flexibility, and cannot be adapted to different playback demands at different playback stages. In view of the above technical problem, a video is divided into a plurality of video segments and the cache decision threshold value is set separately for each video segment to adaptively determine the download strategy at different video segments. The video segment may be understood as segmenting the complete current video under preset segmentation conditions.

The video segments for each video may be at least two, and distribution of video segments includes a video range for each video segment. Optionally, the video range may be a range of video playback ratios, such as 1-50% of the video segments as the first video segment and 50%-100% of the video segments as the second video segment. Accordingly, the video segments are divided according to the playback ratio. Illustratively, the complete video includes n video segments, which may be divided by n−1 playback ratios, e.g., the playback ratios may be 10%, 50%, etc., without limitation. The playback ratio corresponding to each video segment may be determined based on different segment conditions, without limitation.

Optionally, the video range may be a range of playback durations and the video segments may be divided according to playback durations, for example, a video segment of 0-10 minutes as the first video segment, and a video segment of 10-30 minutes as the second video segment. Accordingly, the video segments divide the video based on a plurality of preset duration ranges, in which the plurality of preset duration ranges may be determined according to the total duration of the video, and the playback duration for dividing the video segments is less than the total duration of the video. The playback duration for each video segment may be determined based on different segment conditions, without limitation.

In the playback process of the current video, determining the current video segment corresponding to the current playback time point, in real time, may be based on the video range to which the current playback time point belongs, and determining the video segment corresponding to the video range to which the current playback time point belongs as the current video segment. Exemplarily, the current playback ratio is determined according to the current playback time point and the video duration, and the playback ratio range to which the current playback ratio belongs is determined based on matching the current playback ratio and the playback ratio ranges respectively corresponding to the plurality of video segments to determine the current video segment corresponding to the playback ratio range. Alternatively, according to the playback duration corresponding to the current playback time point and the playback duration ranges corresponding to the plurality of video segments match, the playback duration range to which the current playback time point belongs is determined to determine the current video segment corresponding to the playback duration range.

Each video segment is set with a corresponding cache decision threshold value, and the cache decision threshold value for different video segments is the same or different. The cache decision threshold value for each video segment may be at least one, without limitation. In some embodiments, different video segments correspond to different cache decision threshold values, in which the cache decision threshold values are positively correlated with the playback duration of the video segments. The cache decision threshold value is related to the position of the corresponding video segment in the video, in which the position of the video segment in the video may be characterized by a distance relative to a playback starting point, the larger the distance of the video segment relative to the playback starting point, the larger the cache decision threshold value, and the smaller the distance of the video segment relative to the playback starting point, the smaller the cache decision threshold value.

The cache decision threshold value may be set in advance based on historical video data, and of cause may also be set based on actual conditions, and the value setting of the cache decision threshold value is not limited.

In the process of video playback, the cache decision threshold value corresponding to the video segment to which the current playback time point belongs is determined in real time, to make a judgment on the amount of cached data that is currently cached and not played, and determine the download strategy for the video at the current time point. Through the dynamic cache decision threshold value, different downloading demands are satisfied at different playback stages, realizing the effect of balancing the smoothness of video playback and the efficient utilization of downloading resources.

The technical solution of the embodiments of the present disclosure determines the current video segment corresponding to the current playback time point by, during the playback process to the current video; acquires the cache decision threshold value corresponding to the current video segment; and determines the download strategy for the current video based on the amount of cached data that is currently cached and not played and the cache decision threshold value. By dynamically caching video data according to the progress of video playback, the above scheme realizes precise control of the caching by the player link under satisfying the cost-saving demand, thus reducing waste of video download data without affecting the user's viewing experience.

Figure 3:
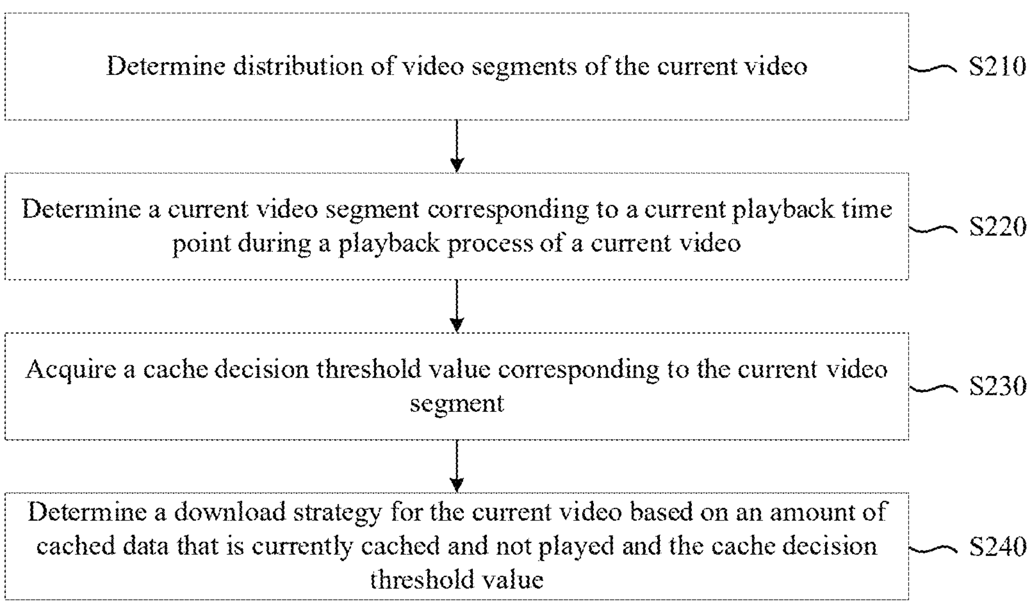
FIG. 3 is a schematic flow diagram of another method for dynamically downloading a video according to an embodiment of the present disclosure.

FIG. 3 is a schematic flow diagram of another method for dynamically downloading a video according to an embodiment of the present disclosure, on the basis of the above embodiment, the step "determining distribution of video segments of the current video" is added before the step "determining a current video segment corresponding to a current playback time point"; as shown in FIG. 3, the method of the present embodiment may also include:

S210, determine distribution of video segments of the current video.

S220, determine a current video segment corresponding to a current playback time point during a playback process of a current video.

S230, acquire a cache decision threshold value corresponding to the current video segment.

S240, determine a download strategy for the current video based on an amount of cached data that is currently cached and not played and the cache decision threshold value.

In an embodiment of the present disclosure, the distribution of video segments may be understood as distribution of video segments situation acquired after segmenting the current video based on a preset distribution condition. Different distribution of video segments can be acquired based on different distribution conditions.

In some embodiments, the distribution of video segments corresponding to the current video may be determined based on the video duration of the current video, in which the video duration of the current video is the total duration of the current video. The smaller the video duration, the greater the probability that the user will play it in its entirety, and the greater the video duration, the greater the probability that the user will exit the playback halfway. The distribution of video segments is set based on the video duration, and the cache decision threshold value at each different time point is set from the dimension of the video duration. For example, different video durations correspond to different distribution of video segments, or different video duration ranges correspond to different distribution of video segments, the video duration range to which the video duration of the current video belongs is determined, and the distribution of video segments corresponding to the video duration range belongs is determined as the distribution of video segments of the current video. Exemplarily, 0.5 hours is used as a division interval of the video duration range, i.e., 0-0.5 hours is used as a first video duration range, and 0.5-1 hours is used as a second video duration range, and a plurality of video duration ranges are set up in sequence, and each video duration range corresponds to distribution of video segments, respectively. When the video duration of the current video is determined to be 45 minutes, i.e., 0.75 hours, the distribution of video segments corresponding to the current video may be determined to be the distribution of video segments corresponding to the second video duration range, thereby determining the distribution of video segments of the current video.

In some embodiments, the distribution of video segments corresponding to the current video is determined according to the video resolution of the current video; the video resolution affects the user's viewing experience of the video, the video resolution is low, the video playback quality is poor, and the probability of the user exiting the video playback is high, correspondingly, the video resolution is high, the video playback quality is good, and the probability of the user exiting the video playback is small; the plurality of distribution of video segments are set according to the video resolution, and the cache decision threshold value for each different time point are set from the dimension of the video resolution. Different distribution of video segments is preset according to different video resolutions, alternatively, different distribution of video segments is preset according to different video resolution ranges. Exemplarily, video segment resolutions of the current video is acquired, e.g., including but not limited to resolutions such as 360p, 720p, and 1080p and the like; and the distribution of video segments corresponding to the video segment resolution of the current video is further recalled. For example, a video resolution of 360p corresponds to the first distribution of video segments, a video resolution of 720p corresponds to the second distribution of video segments, and so on to determine the distribution of video segments of the current video.

In some embodiments, the distribution of video segments corresponding to the current video is determined according to the video resolution and video duration of the current video. In which each distribution of video segments corresponds to a video resolution and a video duration range respectively, and by acquiring the video resolution and the video duration of the current video, and the video resolution and the video duration of the current video are matched with the video resolution and the video duration ranges of the plurality of distribution of video segments, in order to match to acquire the distribution of video segments corresponding to the current video. The distribution of video segments of the current video is jointly determined by the video resolution and the video duration to improve the accuracy of the distribution of video segments.

It should be noted that at least two video segments may be included in distribution of video segments and the same number of video segments may be included in different distribution of video segments. Optionally, three video segments are included in the distribution of video segments. In some embodiments, each video segment in the distribution of video segments may correspond to a preset segment duration range, respectively, for example, taking a video duration of 30 minutes as an example, the distribution of video segments may be to divide the video into three segments: 0-5 minutes, 5-15 minutes, 15-30 minutes; For an example of a video duration range from 30-45 minutes, the distribution of video segments may be to divide the video into three segments: 0-5 minutes, 5-15 minutes, 15 minutes to the end of the video. In some embodiments, each video segment in the distribution of video segments may correspond to a preset segment ratio range, respectively, and different video segments may correspond to different segment ratio ranges, in which the segment ratio is a ratio of the duration of a segment point in the total duration of the video. For example, the distribution of video segments may be to divided a video into three segments: 0-10%, 10%-50%, 50%-100%.

In the playback process of the current video, the cache decision threshold values respectively corresponding to different playback time points may be determined according to the video segments corresponding to the multiple playback time points of the current video, different downloading demands are set for different playback time points through the dynamic cache decision threshold value, avoiding the problem of judgment inflexibility caused by judging the amount of cached data in the videos of different video segments based on the same cache decision threshold value, and realizing the effect of compromising the fluency of video playback and the efficient utilization of downloading resources.

On the basis of the above embodiment, the distribution of video segments determination method, includes: determining a historical playback video based on at least one of video duration and video resolution; and determining the distribution of video segments based on an exit rate at a plurality of playback time points in the historical playback video. The historical playback video may be acquired from the current player or other players that have played the online video.

In the present embodiment, the plurality of distribution of video segments may be respectively set according to at least one of video duration and video resolution as a setting dimension of the distribution of video segments, so as to determine distribution of video segments corresponding to the playback video. When the historical playback video is determined based on the video duration, the historical playback video corresponding to each video duration or each video duration range, respectively, is determined, for example, the played videos with video duration of ten seconds, one minute, ten minutes, half an hour, one hour, or other different durations are respectively acquired as the historical playback video. When the historical playback video is determined based on the video resolution, the played videos of different resolutions are respectively acquired as historical playback videos. When the historical playback video is determined based on the video resolution and the video duration, the played video corresponding to a conditional combination of different resolutions and each video duration range is determined as the historical playback video. Of course, the historical playback video may also be determined based on other manners, and the manner in which the historical playback video is determined is not limited.

After the historical playback video is determined, an exit rate of the historical playback video at the plurality of playback time points is determined, and the distribution of video segments is determined based on the exit rate of the historical playback video at the plurality of playback time points. The exit rate can understand the ratio of the user exiting the viewing in the process of the video playback. The distribution of video segments is determined for the historical play video corresponding to each setting condition, and exemplarily, a set of historical play videos with video duration of ten seconds (or less than ten seconds) is acquired, and the distribution of video segments corresponding to the video with video duration of ten seconds (or less than ten seconds) is determined; exemplarily, a set of historical playback videos with the video resolution of 1080P is acquired, and distribution of video segments corresponding to the video with the video resolution of 1080P is determined; exemplarily, a set of historical playback videos with the video resolution of 1080P and the video duration in the range of half an hour to one hour is acquired, and distribution of video segments corresponding to videos with the video resolution of 1080P and the video duration in the range of half an hour to one hour are determined.

Optionally, for each set of historical playback videos, the method of determining the exit rate at any playback time point may include: acquiring an added value of the video viewing ratio at the current video playback time point, and an added value of the viewing records to the total viewing records ratio at the current video playback time point, and determining the exit rate at the current time point based on a ratio of the added value of the video viewing ratio to the added value of the viewing records to the total viewing records ratio.

Figure 4:
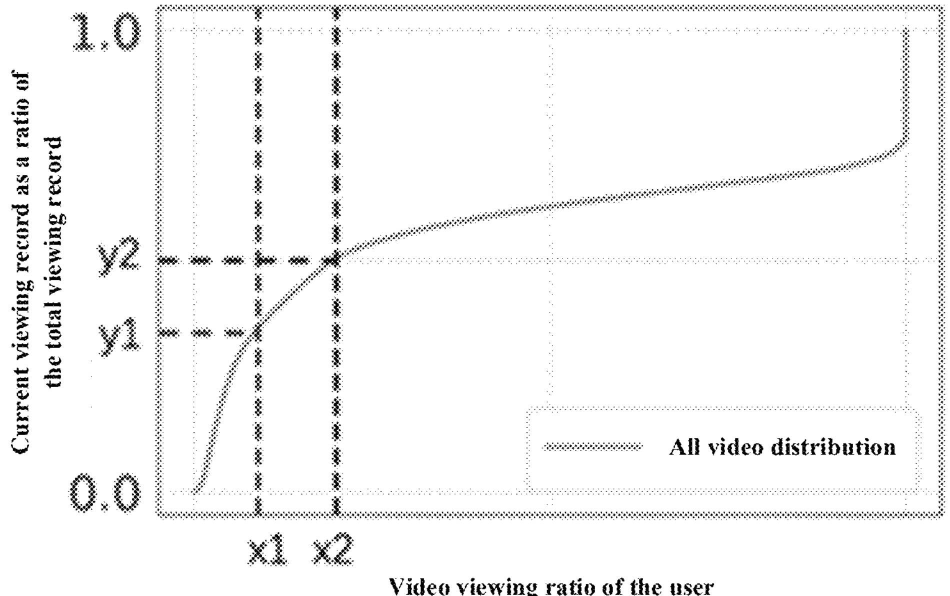
FIG. 4 is a cumulative distribution function diagram of a video viewing ratio according to an embodiment of the present disclosure.

An exemplary illustration is shown in FIG. 4, FIG. 4 shows a cumulative distribution function diagram of the video viewing ratio. The abscissa in the FIG. 4 represents the video viewing ratio of the user. Exemplarily, the user video viewing ratio may be determined based on the playback duration when the user exits the viewing and the total duration of the currently playback video. The ordinate in the FIG. 4 represents the current viewing record as a ratio of the total viewing record. Exemplarily, the ratio of current viewing records to total viewing records may be determined based on the number of users currently watching the video and the total number of users watching the video.

Exemplarily, the added value of the video viewing ratio is determined based on a difference between the value of the video viewing ratio at the second time (X2) and the value of the video viewing ratio at the first time (X1), the added value of the viewing records to the total viewing records ratio is determined based on a difference between the second viewing records to the total viewing records ratio (y2) and the first viewing records to the total viewing records ratio (y1), and the exit rate of the current video segment is determined based on a ratio of the added value of the video viewing ratio to the added value of the viewing records to the total viewing records ratio. With continued reference to FIG. 4, it can be seen that the exit rate in the cumulative distribution function curve grows faster in the early part of the video playback, indicating that more users exit video viewing in the early part of the video playback.

Optionally, an exit rate threshold value may be set in advance, video segmentation of each group of historical playback videos is performed based on the exit rate threshold value to determine the distribution of video segments of each group of historical playback videos. Exemplarily, the video is divided into three video segments according to the exit rate threshold value and the exit rate of each group of historical playback videos at a plurality of video playback time points. Optionally, the exit rate threshold value includes a first threshold value and a second threshold value, the first threshold value is smaller than the second threshold value, and accordingly, the distribution of video segments includes a video start playback point to a playback point corresponding to the first threshold value, the playback point corresponding to the first threshold value to a playback point corresponding to the second threshold value, and the playback point corresponding to the second threshold value to a playback end point, in which a playback point corresponding to the exit rate threshold value may be a playback time point, and may be a ratio of the playback time point in the total duration of the video. Referring to FIG. 4, each video segment includes the first video segment with a highest exit rate from the start of playback to the first dashed line marked; the second video segment with a higher exit rate between the first dashed line and the second dashed line; the third video segment with a smooth exit rate after the second dashed line.

Of course, the above-described distribution of each video segment is merely as an optional distribution, and the present embodiment may also choose other distribution, the present embodiment comparison is not limited, but also no longer not enumerated.

In an embodiment of the present disclosure, after determining the distribution of video segments of the current video, the method of determining the current video segment corresponding to the current playback time point based on the distribution of video segments further includes: determining a playback duration range corresponding to each video segment in distribution of video segments respectively; and determining the current video segment corresponding to the current playback time point according to a playback duration range to which the current playback time point belongs.

The technical solution of the embodiments of the present disclosure, determines the distribution of video segments of the current video, in the playback process to the current video; and determines the current video segment corresponding to the current playback time point; acquires the cache decision threshold value corresponding to the current video segment; and determines the download strategy for the current video based on the amount of cached data that is currently cached and not played and the cache decision threshold value. The above scheme, by presetting the distribution of video segments situation of the video in currently playback, and dynamically caching the video data according to the video playback progress and the video segment at the current playback time point, reduces the influence on the user's watching experience as much as possible under meeting the requirement of cost saving, thereby realizing reducing the waste of video download data without affecting the user's watching experience.

Figure 5:
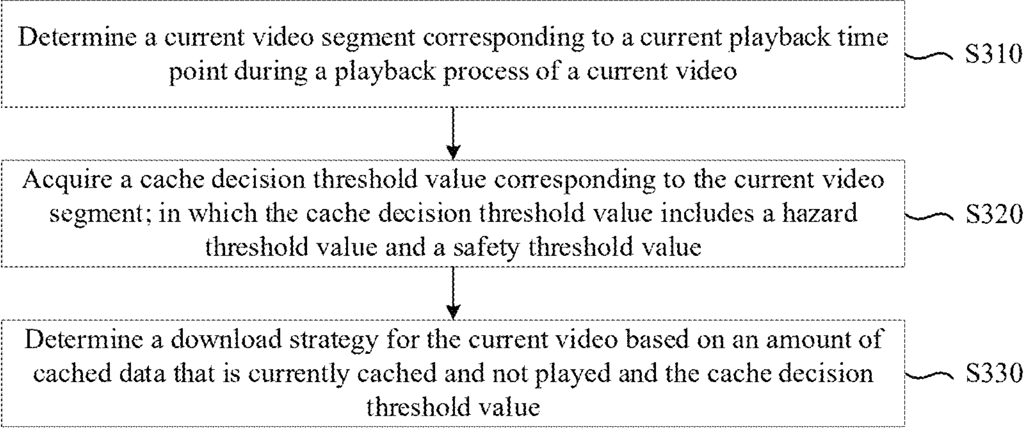
FIG. 5 is a schematic flow diagram of another method for dynamically downloading a video according to an embodiment of the present disclosure.

FIG. 5 is a schematic flow diagram of another method for dynamically downloading a video according to an embodiment of the present disclosure, based on the above embodiments, the step "acquiring a cache decision threshold value corresponding to the current video segment" is refined to "acquiring a cache decision threshold value corresponding to the current video segment; in which the cache decision threshold value includes a hazard threshold value and a safety threshold value"; as shown in FIG. 5, the method of the present embodiment further includes:

S310, determine a current video segment corresponding to a current playback time point during a playback process of a current video.

S320, acquire a cache decision threshold value corresponding to the current video segment; in which the cache decision threshold value includes a hazard threshold value and a safety threshold value.

S330, determine a download strategy for the current video based on an amount of cached data that is currently cached and not played and the cache decision threshold value.

In an embodiment of the present disclosure, in order to realize the efficient utilization of downloaded resources as well as to take into account the smoothness of video playback, the preset cache decision threshold value includes the hazard threshold value and the safety threshold value, the safety threshold value is greater than the hazard threshold value. The hazard threshold value may be understood as a cache threshold value at which the amount of cached data that is currently cached and not played is insufficient to support the playback at the next time point, i.e., a cache threshold value at which no further downloading of video data will result in a higher probability of video stuttering; the safety threshold value may be understood as a cache threshold value at which the amount of cached data that is currently cached and not played may further support playback by the current player for a period of time, i.e. a cache threshold value at which no further downloading of the video data will not immediately result in video stuttering. Of course, the above-described division of the hazard threshold value and the safety threshold value is merely an optional embodiment, and other forms of division may be made depending on the circumstances, without limitation.

It should be noted that the hazard threshold value and the safety threshold value in the present embodiment may be preset based on the video duration and the video resolution, or may be set based on the actual situation, and of course, the hazard threshold value and the safety threshold value may be determined the same or different according to the video segment corresponding to the current playback time point during the playback process, and the present embodiment does not limit the setting of the hazard threshold value and the safety threshold value.

In the embodiment, after determining the hazard threshold value and the safety threshold value in the cache decision threshold value, the method of determining the download strategy for the current video further includes: in response to the amount of cached data that is currently cached and not played is less than the hazard threshold value, triggering download of the current video; in response to the amount of cached data that is currently cached and not played is greater than the safety threshold value, stopping download of an un-downloaded video, and continuing to acquire, in real time, the amount of cached data that is currently cached and not played (i.e. the player playback the cached data).

In some embodiments, the amount of cached data that the current video that is currently cached and not played in the playback process, i.e., the current playback cache progress stored by the data cache region of the player, may be acquired based on a preset time interval. The current playback cache progress is compared with the hazard threshold value and the safety threshold value in the cache decision threshold value, respectively, and the download strategy is determined based on the comparison results. Exemplarily, the playback cache progress is compared with the hazard threshold value and the safety threshold value, respectively, and when the current playback cache progress is lower than the hazard threshold value, a current download operation for the current video is triggered. After the current download of the video data is finished, the playback cache progress stored by the data cache region of the player is continued to be acquired and continues to compare the playback cache progress with the hazard threshold value and the safety threshold value. When the playback cache progress is higher than the safety threshold value, the data download module stops the downloading of the un-downloaded video, and playback the cached data. When the playback cache progress is higher than the hazard threshold value and lower than the safety threshold value, the current state is maintained and the current playback cache progress is continuously updated and the updated current playback cache progress is compared with the hazard threshold value and the safety threshold value, respectively.

In the playback process of the current video, the hazard threshold value and the safety threshold value to which the current video corresponds may be determined according to the distribution of video segments to which the current video corresponds. Exemplary, continued reference is made to FIG. 4. The current video is divided into different video segments according to the user's exit rate in the video playback. FIG. 4 includes three video segments, each video segment corresponding to a group of hazard threshold values and safety threshold values, respectively, to facilitate dynamic determination of download strategies based on different hazard threshold values and safety threshold values adaptively at different video segments, thereby maximizing cost savings.

For the first video segment: the probability of user exit is larger, setting smaller hazard threshold values and safety threshold values makes the amount of cached data that is currently cached and not played as small as possible, so as to reduce the waste of the amount of data. For the second video segment: the user exit probability becomes smaller, the threshold value range of the hazard threshold value and the safety threshold value is adjusted upward compared to the first video segment, so that the current player can cache a suitable amount of video data to guarantee a smooth playback of the current video. For the third stage: the user exit rate is the smoothest, indicating that the user has a higher probability of completing the video viewing, so that a larger hazard threshold value and safety threshold value are set, both to ensure the user's viewing experience and to control the amount of data wasted.

It is worth noting that under the original video download logic, the data download module stops downloading only when the entire video download is complete. When the user exits the view, any data in the cache and the data download module that is not read is wasted. The technical solution of the present embodiment can effectively control the progress of video download, reduce the amount of data downloaded, reduce the waste of data, by presetting the safety threshold value and the hazard threshold value, the data downloading module starts downloading when the hazard threshold value is reached, and the data downloading module stops downloading when the safety threshold value is met, so that the maximization of cost saving can be realized.

Optionally, on the basis of the above embodiment, the method of triggering the download of the current video may include: generating a download request for a next video block, and transmitting the download request to the server to download the next video block. In which, the video block may be understood as a preset data amount of video data. The generated download request may be a video data download request includes a preset data amount.

Exemplarily, the video data reading request is transmitted to the server so that the data download module acquires the video data of the preset data amount and performs data caching. Exemplarily, generating a video data download request of a preset amount of data may include determining an amount of download data based on duration of the next video block and a current code rate, and generating the download request based on the amount of download data.

Exemplarily, the video duration of the video data in the next video block is acquired and network rate of the current download data is determined, i.e., the amount of download data of the next video block is determined based on the video duration and the network rate, and the download request is generated based on the amount of download data. The above technical solution can avoid continuous caching of resources by the data download module and reduce cached data inside the data download module by performing block splitting on the video data requested in the download request to request video blocks of a fixed duration each time.

The technical solution of the embodiment of the present disclosure can effectively control the progress of video download, reduce the amount of data downloaded, reduce the waste of data, by presetting a safety threshold value and a hazard threshold value, the data downloading module starts downloading when the hazard threshold value is reached, the data downloading module stops downloading when the safety threshold value is met, and request video blocks of a fixed duration each time the download is made, so that the maximization of cost saving can be realized.

Figure 6:
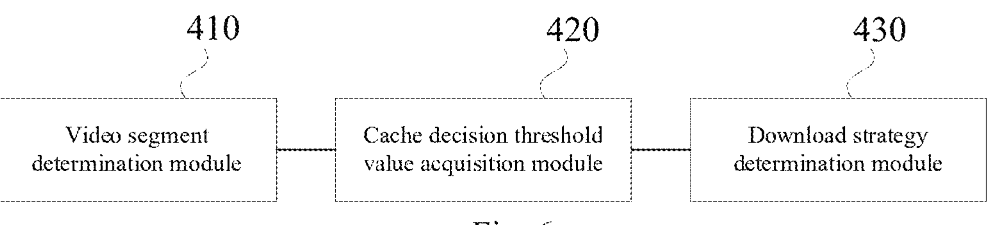
FIG. 6 is a schematic diagram of a structure of an apparatus for dynamically downloading a video according to an embodiment of the present disclosure.

FIG. 6 is a schematic diagram of a structure of an apparatus for dynamically downloading a video according to an embodiment of the present disclosure. As shown in FIG. 6, the apparatus includes: a video segment determination module 410, a cache decision threshold value acquisition module 420, and a download strategy determination module 430.

The video segment determination module 410 is configured to determine a current video segment corresponding to a current playback time point during a playback process of a current video.

The cache decision threshold value acquisition module 420 is configured to is configured to acquire a cache decision threshold value corresponding to the current video segment.

The download strategy determination module 430 is configured to determine a download strategy for the current video based on an amount of cached data that is currently cached and not played and the cache decision threshold value.

The technical solution of the embodiments of the present disclosure, determines the current video segment corresponding to the current playback time point during the playback process of the current video; acquires the cache decision threshold value corresponding to the current video segment; and determines the download strategy for the current video based on the amount of cached data that is currently cached and not played and the cache decision threshold value. The above scheme by dynamically caching the video data according to the video playback progress, realizing the player link requires precise control of the caching under meeting the cost-saving demands, thereby realizing reduction of waste of video download data without affecting the user viewing experience.

Optionally, on the basis of the above embodiment, the video segment determination module 410 includes: a playback duration range determination unit and a current video segment determination unit.

The playback duration range determination unit is configured to determine a playback duration range corresponding to each video segment in distribution of video segments respectively.

The current video segment determination unit is configured to determine the current video segment corresponding to the current playback time point according to a playback duration range to which the current playback time point belongs.

Optionally, on the basis of the above embodiment, the apparatus further includes: a first distribution of video segments determination module.

The first distribution of video segments determination module is configured to determine the distribution of video segments corresponding to the current video based on video duration of the current video.

Optionally, on the basis of the above embodiment, the apparatus further includes: a second distribution of video segments determination module.

The second distribution of video segments determination module is configured to determine the distribution of video segments corresponding to the current video according to video resolution of the current video.

Optionally, on the basis of the above embodiment, the apparatus further includes: a historical playback video determination module and a third distribution of video segments determination module.

The historical playback video determination module is configured to determine a historical playback video based on at least one of video duration and video resolution;

The third distribution of video segments determination module configured to determine the distribution of video segments based on an exit rate at a plurality of playback time points in the historical playback video.

Optionally, on the basis of the above embodiment, different video segments correspond to different cache decision threshold values, the cache decision threshold value is positively correlated with playback duration of a video segment.

Optionally, on the basis of the above embodiment, the cache decision threshold value includes a hazard threshold value and a safety threshold value.

The download strategy determination module 430 includes: a first download strategy determination submodule and a second download strategy determination submodule.

The first download strategy determination submodule is configured to trigger download of the current video when the amount of cached data that is currently cached and not played is less than the hazard threshold value.

The second download strategy determination submodule is configured to stop download of an un-downloaded video, and continue to acquire, in real time, the amount of cached data that is currently cached and not played, when the amount of cached data that is currently cached and not played is greater than the safety threshold value.

Optionally, on the basis of the above embodiment, the first download strategy determination submodule, includes: a first video block download unit.

The first video block download unit is configured to generate a download request for a next video block, and transmit the download request to a server to download the next video block.

Optionally, on the basis of the above embodiment, the first video block download unit, includes: a download request generation subunit.

The download request generation subunit is configured to determine an amount of download data based on duration of the next video block and a current code rate, and generate the download request based on the amount of download data.

The apparatus provided by the embodiments of the present disclosure may perform the method provided by any of the embodiments of the present disclosure, and may have corresponding functional modules for performing the method.

It should be noted that the respective units and modules included in the above apparatus are divided only according to functional logic, but are not limited to the above division as long as the corresponding functions can be realized; in addition, the specific names of the respective functional units are also merely for convenience of distinguishing from each other, and are not used to limit the protection scope of the embodiments of the present disclosure.

Figure 7:
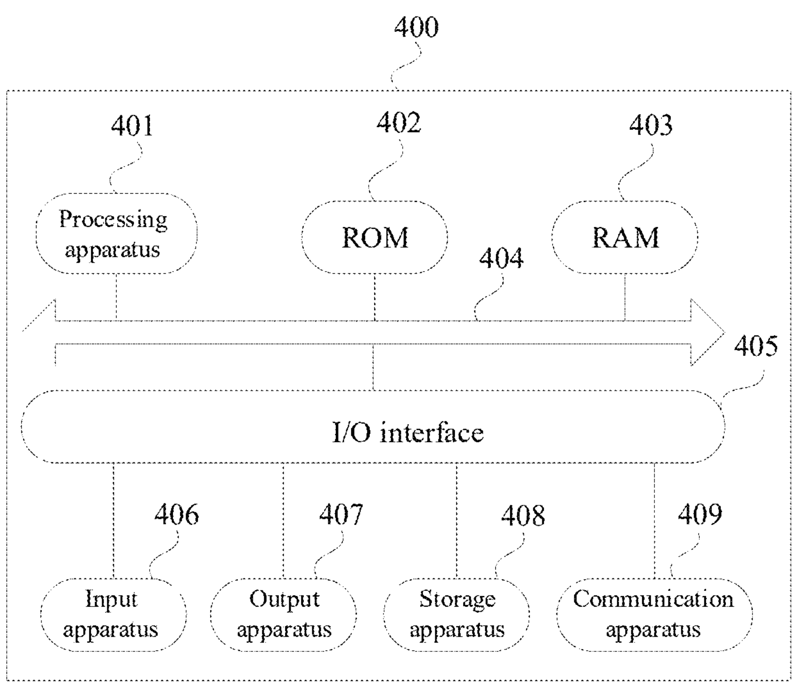
FIG. 7 is a schematic diagram of a structure of an electronic device according to an embodiment of the present disclosure.

Referring to FIG. 7, FIG. 7 illustrates a schematic structural diagram of an electronic device 400 (For example, the terminal device or server in FIG. 7) suitable for implementing some embodiments of the present disclosure. The electronic devices in some embodiments of the present disclosure may include but are not limited to mobile terminals such as a mobile phone, a notebook computer, a digital broadcasting receiver, a personal digital assistant (PDA), a portable Android device (PAD), a portable media player (PMP), a vehicle-mounted terminal (e.g., a vehicle-mounted navigation terminal), a wearable electronic device or the like, and fixed terminals such as a digital TV, a desktop computer, or the like. The electronic device illustrated in FIG. 7 is merely an example, and should not pose any limitation to the functions and the range of use of the embodiments of the present disclosure.

As illustrated in FIG. 7, the electronic device 400 may include a processing apparatus 401 (e.g., a central processing unit, a graphics processing unit, etc.), which can perform various suitable actions and processing according to a program stored in a read-only memory (ROM) 402 or a program loaded from a storage apparatus 408 into a random-access memory (RAM) 403. The RAM 403 further stores various programs and data required for operations of the electronic device 400. The processing apparatus 401, the ROM 402, and the RAM 403 are interconnected by means of a bus 404. An input/output (I/O) interface 405 is also connected to the bus 404.

Usually, the following apparatus may be connected to the I/O interface 405: an input apparatus 406 including, for example, a touch screen, a touch pad, a keyboard, a mouse, a camera, a microphone, an accelerometer, a gyroscope, or the like; an output apparatus 407 including, for example, a liquid crystal display (LCD), a loudspeaker, a vibrator, or the like; a storage apparatus 408 including, for example, a magnetic tape, a hard disk, or the like; and a communication apparatus 409. The communication apparatus 409 may allow the electronic device 400 to be in wireless or wired communication with other devices to exchange data. While FIG. 7 illustrates the electronic device 400 having various apparatuses, it should be understood that not all of the illustrated apparatuses are necessarily implemented or included. More or fewer apparatuses may be implemented or included optionally.

Particularly, according to some embodiments of the present disclosure, the processes described above with reference to the flowcharts may be implemented as a computer software program. For example, some embodiments of the present disclosure include a computer program product, which includes a computer program carried by a non-transitory computer-readable medium. The computer program includes program codes for performing the methods shown in the flowcharts. In such embodiments, the computer program may be downloaded online through the communication apparatus 409 and installed, or may be installed from the storage apparatus 408, or may be installed from the ROM 402. When the computer program is executed by the processing apparatus 401, the above-mentioned functions defined in the methods of some embodiments of the present disclosure are performed.

The electronic device provided by the embodiments of the present disclosure belongs to the same inventive concept as the method for dynamically downloading the video provided by the above embodiments, technical details that are not elaborately described in the present embodiment can be referred to the above embodiments.

An embodiment of the present disclosure provides a computer storage medium on which a computer program is stored; and when the program is executed by a processor, the method for dynamically downloading the video according to the above embodiment is implemented.

It should be noted that the above-mentioned computer-readable medium in the present disclosure may be a computer-readable signal medium or a computer-readable storage medium or any combination thereof. For example, the computer-readable storage medium may be, but not limited to, an electric, magnetic, optical, electromagnetic, infrared, or semiconductor system, apparatus or device, or any combination thereof. More specific examples of the computer-readable storage medium may include but not be limited to: an electrical connection with one or more wires, a portable computer disk, a hard disk, a random-access memory (RAM), a read-only memory (ROM), an erasable programmable read-only memory (EPROM or flash memory), an optical fiber, a compact disk read-only memory (CD-ROM), an optical storage device, a magnetic storage device, or any appropriate combination of them. In the present disclosure, the computer-readable storage medium may be any tangible medium containing or storing a program that can be used by or in combination with an instruction execution system, apparatus or device. In the present disclosure, the computer-readable signal medium may include a data signal that propagates in a baseband or as a part of a carrier and carries computer-readable program codes. The data signal propagating in such a manner may take a plurality of forms, including but not limited to an electromagnetic signal, an optical signal, or any appropriate combination thereof. The computer-readable signal medium may also be any other computer-readable medium than the computer-readable storage medium. The computer-readable signal medium may send, propagate or transmit a program used by or in combination with an instruction execution system, apparatus or device. The program code contained on the computer-readable medium may be transmitted by using any suitable medium, including but not limited to an electric wire, a fiber-optic cable, radio frequency (RF) and the like, or any appropriate combination of them.

In some implementation modes, the client and the server may communicate with any network protocol currently known or to be researched and developed in the future such as hypertext transfer protocol (HTTP), and may communicate (via a communication network) and interconnect with digital data in any form or medium. Examples of communication networks include a local area network (LAN), a wide area network (WAN), the Internet, and an end-to-end network (e.g., an ad hoc end-to-end network), as well as any network currently known or to be researched and developed in the future.

The above-mentioned computer-readable medium may be included in the above-mentioned electronic device, or may also exist alone without being assembled into the electronic device.

The above-mentioned computer-readable medium carries one or more programs, and when the one or more programs are executed by the electronic device, the electronic device is caused to:

- determine a current video segment corresponding to a current playback time point during a playback process of a current video;
- acquire a cache decision threshold value corresponding to the current video segment; and
- determine a download strategy for the current video based on an amount of cached data that is currently cached and not played and the cache decision threshold value.

The computer program codes for performing the operations of the present disclosure may be written in one or more programming languages or a combination thereof. The above-mentioned programming languages include but are not limited to object-oriented programming languages such as Java, Smalltalk, C++, and also include conventional procedural programming languages such as the "C" programming language or similar programming languages. The program code may be executed entirely on the user's computer, partly on the user's computer, as a stand-alone software package, partly on the user's computer and partly on a remote computer, or entirely on the remote computer or server. In the scenario related to the remote computer, the remote computer may be connected to the user's computer through any type of network, including a local area network (LAN) or a wide area network (WAN), or the connection may be made to an external computer (for example, through the Internet using an Internet service provider).

The flowcharts and block diagrams in the accompanying drawings illustrate the architecture, functionality, and operation of possible implementations of systems, methods, and computer program products according to various embodiments of the present disclosure. In this regard, each block in the flowcharts or block diagrams may represent a module, a program segment, or a portion of codes, including one or more executable instructions for implementing specified logical functions. It should also be noted that, in some optional implementations, the functions noted in the blocks may also occur out of the order noted in the accompanying drawings. For example, two blocks shown in succession may, in fact, can be executed substantially concurrently, or the two blocks may sometimes be executed in a reverse order, depending upon the functionality involved. It should also be noted that, each block of the block diagrams and/or flowcharts, and combinations of blocks in the block diagrams and/or flowcharts, may be implemented by a dedicated hardware-based system that performs the specified functions or operations, or may also be implemented by a combination of dedicated hardware and computer instructions.

The modules or units involved in the embodiments of the present disclosure may be implemented in software or hardware. Among them, the name of the module or unit does not constitute a limitation of the unit itself under certain circumstances.

The functions described herein above may be performed, at least partially, by one or more hardware logic components. For example, without limitation, available exemplary types of hardware logic components include: a field programmable gate array (FPGA), an application specific integrated circuit (ASIC), an application specific standard product (ASSP), a system on chip (SOC), a complex programmable logical device (CPLD), etc.

In the context of the present disclosure, the machine-readable medium may be a tangible medium that may include or store a program for use by or in combination with an instruction execution system, apparatus or device. The machine-readable medium may be a machine-readable signal medium or a machine-readable storage medium. The machine-readable medium includes, but is not limited to, an electrical, magnetic, optical, electromagnetic, infrared, or semi-conductive system, apparatus or device, or any suitable combination of the foregoing. More specific examples of machine-readable storage medium include electrical connection with one or more wires, portable computer disk, hard disk, random-access memory (RAM), read-only memory (ROM), erasable programmable read-only memory (EPROM or flash memory), optical fiber, portable compact disk read-only memory (CD-ROM), optical storage device, magnetic storage device, or any suitable combination of the foregoing.

According to at least one embodiment of the present disclosure, [Example 1] provides a method for dynamically downloading a video, the method includes:

- determining a current video segment corresponding to a current playback time point during a playback process of a current video;
- acquiring a cache decision threshold value corresponding to the current video segment; and
- determining a download strategy for the current video based on an amount of cached data that is currently cached and not played and the cache decision threshold value.

According to at least one embodiment of the present disclosure, [Example 2] provides a method for dynamically downloading a video, the method further includes:

- the determining a current video segment corresponding to a current playback time point, includes:
- determining a playback duration range corresponding to each video segment in distribution of video segments respectively;
- determining the current video segment corresponding to the current playback time point according to a playback duration range to which the current playback time point belongs.

According to at least one embodiment of the present disclosure, [Example 3] provides a method for dynamically downloading a video, the method further includes:

- a manner of determining the distribution of video segments, includes:
- determining the distribution of video segments corresponding to the current video based on video duration of the current video.

According to at least one embodiment of the present disclosure, [Example 4] provides a method for dynamically downloading a video, the method further includes:

a manner of determining the distribution of video segments, includes:

determining the distribution of video segments corresponding to the current video according to video resolution of the current video.

According to at least one embodiment of the present disclosure, [Example 5] provides a method for dynamically downloading a video, the method further includes:

the manner of determining the distribution of video segments, includes:

determining a historical playback video based on at least one of video duration and video resolution;

determining the distribution of video segments based on an exit rate at a plurality of playback time points in the historical playback video.

According to at least one embodiment of the present disclosure, [Example 6] provides a method for dynamically downloading a video, the method further includes:

different video segments correspond to different cache decision threshold values, the cache decision threshold value is positively correlated with playback duration of a video segment.

According to at least one embodiment of the present disclosure, [Example 7] provides a method for dynamically downloading a video, the method further includes:

the cache decision threshold value includes a hazard threshold value and a safety threshold value;

the determining a download strategy for the current video based on an amount of cached data that is currently cached and not played and the cache decision threshold value, includes:

in response to the amount of cached data that is currently cached and not played is less than the hazard threshold value, triggering download of the current video;

in response to the amount of cached data that is currently cached and not played is greater than the safety threshold value, stopping download of an un-downloaded video, and continuing to acquire, in real time, the amount of cached data that is currently cached and not played.

According to at least one embodiment of the present disclosure, [Example 8] provides a method for dynamically downloading a video, the method further includes:

the triggering download of the current video, includes:

generating a download request for a next video block, and transmitting the download request to a server to download the next video block.

According to at least one embodiment of the present disclosure, [Example 9] provides a method for dynamically downloading a video, the method further includes:

the generating a download request for a next video block, includes:

determining an amount of download data based on duration of the next video block and a current code rate, and generating the download request based on the amount of download data.

According to at least one embodiment of the present disclosure, [Example 10] provides an apparatus for dynamically downloading a video, the apparatus includes: a video segment determination module, a cache decision threshold value acquisition module and a download strategy determination module.

The video segment determination module is configured to determine a current video segment corresponding to a current playback time point during a playback process of a current video.

The cache decision threshold value acquisition module is configured to acquire a cache decision threshold value corresponding to the current video segment.

The download strategy determination module is configured to determine a download strategy for the current video based on an amount of cached data that is currently cached and not played and the cache decision threshold value.

Furthermore, while operations are depicted in a particular order, this should not be understood as requiring that these operations be performed in the particular order shown or in sequential order. In certain circumstances, multitasking and parallel processing may be advantageous. Likewise, while several specific implementation details are contained in the above discussion, these should not be construed as limitations on the scope of the present disclosure. Certain features that are described in the context of separate embodiments can also be implemented in combination in a single embodiment.

Conversely, various features that are described in the context of a single embodiment can also be implemented in multiple embodiments separately or in any suitable sub-combination.

The invention claimed is:

1. A method for dynamically downloading a video, comprising:

determining a current video segment corresponding to a current playback time point during a playback process of a current video;

acquiring a cache decision threshold value corresponding to the current video segment; and determining a download strategy for the current video based on an amount of cached data that is currently cached and not played and the cache decision threshold value, wherein the determining the current video segment corresponding to the current playback time point comprises:

determining a playback duration range corresponding to each video segment in distribution of video segments respectively, wherein a manner of determining the distribution of video segments comprises:

determining a historical playback video based on at least one of video duration and video resolution, and determining the distribution of video segments based on an exit rate at a plurality of playback time points in the historical playback video; and determining the current video segment corresponding to the current playback time point according to a playback duration range to which the current playback time point belongs.

2. The method according to claim 1, wherein the manner of determining the distribution of video segments, comprises:

determining the distribution of video segments corresponding to the current video based on video duration of the current video.

3. The method according to claim 1, wherein the manner of determining the distribution of video segments, comprises:

determining the distribution of video segments corresponding to the current video according to video resolution of the current video.

4. The method according to claim 1, wherein different video segments correspond to different cache decision threshold values, the cache decision threshold value is positively correlated with playback duration of a video segment.

5. The method according to claim 1, wherein the cache decision threshold value comprises a hazard threshold value and a safety threshold value;

the determining a download strategy for the current video based on an amount of cached data that is currently cached and not played and the cache decision threshold value, comprises:

in response to the amount of cached data that is currently cached and not played is less than the hazard threshold value, triggering download of the current video; and in response to the amount of cached data that is currently cached and not played is greater than the safety threshold value, stopping download of an un-downloaded video, and continuing to acquire, in real time, the amount of cached data that is currently cached and not played.

6. The method according to claim 5, wherein the triggering download of the current video, comprises:

generating a download request for a next video block, and transmitting the download request to a server to download the next video block.

7. The method according to claim 6, wherein the generating a download request for a next video block, comprises:

determining an amount of download data based on duration of the next video block and a current code rate, and generating the download request based on the amount of download data.

8. An electronic device comprising:

at least one processor; and a storage apparatus, configured to store at least one program, wherein when the at least one program executed by the at least one processor, causes the at least one processor to implement operations, the operations comprise:

determining a current video segment corresponding to a current playback time point during a playback process of a current video;

acquiring a cache decision threshold value corresponding to the current video segment; and determining a download strategy for the current video based on an amount of cached data that is currently cached and not played and the cache decision threshold value, wherein the determining the current video segment corresponding to the current playback time point comprises:

determining a playback duration range corresponding to each video segment in distribution of video segments respectively, wherein a manner of determining the distribution of video segments comprises:

determining a historical playback video based on at least one of video duration and video resolution, and determining the distribution of video segments based on an exit rate at a plurality of playback time points in the historical playback video; and determining the current video segment corresponding to the current playback time point according to a playback duration range to which the current playback time point belongs.

9. The electronic device according to claim 8, wherein the manner of determining the distribution of video segments, comprises:

determining the distribution of video segments corresponding to the current video based on video duration of the current video.

10. The electronic device according to claim 8, wherein the manner of determining the distribution of video segments, comprises:

determining the distribution of video segments corresponding to the current video according to video resolution of the current video.

11. The electronic device according to claim 8, wherein different video segments correspond to different cache decision threshold values, the cache decision threshold value is positively correlated with playback duration of a video segment.

12. The electronic device according to claim 8, wherein the cache decision threshold value comprises a hazard threshold value and a safety threshold value;

the determining a download strategy for the current video based on an amount of cached data that is currently cached and not played and the cache decision threshold value, comprises:

in response to the amount of cached data that is currently cached and not played is less than the hazard threshold value, triggering download of the current video; and in response to the amount of cached data that is currently cached and not played is greater than the safety threshold value, stopping download of an un-downloaded video, and continuing to acquire, in real time, the amount of cached data that is currently cached and not played.

13. The electronic device according to claim 12, wherein the triggering download of the current video, comprises:

generating a download request for a next video block, and transmitting the download request to a server to download the next video block.

14. The electronic device according to claim 13, wherein the generating a download request for a next video block, comprises:

determining an amount of download data based on duration of the next video block and a current code rate, and generating the download request based on the amount of download data.

15. A non-transitory computer-readable storage medium comprising computer-executable instructions, when the computer-executable instructions executed by a computer processor, are used to perform operations, the operations comprise:

determining a current video segment corresponding to a current playback time point during a playback process of a current video;

acquiring a cache decision threshold value corresponding to the current video segment; and determining a download strategy for the current video based on an amount of cached data that is currently cached and not played and the cache decision threshold value, wherein the determining the current video segment corresponding to the current playback time point comprises:

determining a playback duration range corresponding to each video segment in distribution of video segments respectively, wherein a manner of determining the distribution of video segments comprises:

determining a historical playback video based on at least one of video duration and video resolution, and determining the distribution of video segments based on an exit rate at a plurality of playback time points in the historical playback video; and determining the current video segment corresponding to the current playback time point according to a playback duration range to which the current playback time point belongs.

16. The non-transitory computer-readable storage medium according to claim 15, wherein the manner of determining the distribution of video segments comprises:

determining the distribution of video segments corresponding to the current video based on video duration of the current video.

17. The non-transitory computer-readable storage medium according to claim 15, wherein the manner of determining the distribution of video segments comprises:

determining the distribution of video segments corresponding to the current video according to video resolution of the current video.

18. The non-transitory computer-readable storage medium according to claim 15, wherein different video segments correspond to different cache decision threshold values, the cache decision threshold value is positively correlated with playback duration of a video segment.

19. The non-transitory computer-readable storage medium according to claim 15, wherein the cache decision threshold value comprises a hazard threshold value and a safety threshold value;

the determining a download strategy for the current video based on an amount of cached data that is currently cached and not played and the cache decision threshold value, comprises:

in response to the amount of cached data that is currently cached and not played is less than the hazard threshold value, triggering download of the current video; and in response to the amount of cached data that is currently cached and not played is greater than the safety threshold value, stopping download of an un-downloaded video, and continuing to acquire, in real time, the amount of cached data that is currently cached and not played.

20. The non-transitory computer-readable storage medium according to claim 19, wherein the triggering download of the current video comprises:

generating a download request for a next video block, and transmitting the download request to a server to download the next video block.

* * * * *